Feb. 19, 1963  A. ERNST  3,077,771

HARDNESS MEASURING APPARATUS

Filed May 6, 1959

INVENTOR
ALFRED ERNST

BY *Greene, Pincles & Durr*

ATTORNEY

United States Patent Office 3,077,771
Patented Feb. 19, 1963

3,077,771
HARDNESS MEASURING APPARATUS
Alfred Ernst, Via Magenta 10, Varese, Italy
Filed May 6, 1959, Ser. No. 811,355
Claims priority, application Italy May 13, 1958
5 Claims. (Cl. 73—81)

The present invention relates to an apparatus for measuring the hardness of materials.

Among the conventional apparatuses for measuring the hardness of materials, a particular suitable one is an apparatus of the same applicant (U.S. Patent 2,667,065) comprising a penetrating or indenting tip driving a hydraulic measuring system.

In the said apparatus the penetrating tip is slidably mounted with respect to a bottom plane adapted to rest on the surface of the metal to be tested during the carrying out of the measurement, that is, by coming into contact with the test-piece the penetrating tip withdraws to an extent, which will be transformed into a highly magnified displacement of the hydraulic measuring system. This apparatus will therefore provide measurements of a certain accuracy only when the metal surface to be tested is perfectly smooth, as otherwise, the penetrating tip not being perfectly normal to the bottom plane at the beginning of the measurement causes noticeable errors in the measurements.

The object of the present invention is to eliminate the above mentioned inconvenience by providing a hardness measuring apparatus permitting good accuracy independently of the smoothness of the material being tested.

The apparatus according to the present invention comprises in combination: a penetrating tip driving a measuring instrument and slidably mounted with respect to a bottom plane; calibrated resilient means adapted to apply the required load to the penetrating tip; damping or otherwise braking means adapted to slow down the application of the load by the resilient means at the moment in which the penetrating tip contacts the test-surface.

The measuring apparatus according to the present invention will be better illustrated in the following detailed specification given by way of a non-limiting example, wherein reference is made to the accompanying drawing in which.

Similar parts are indicated by the same reference numerals in both figures.

Figure 1:
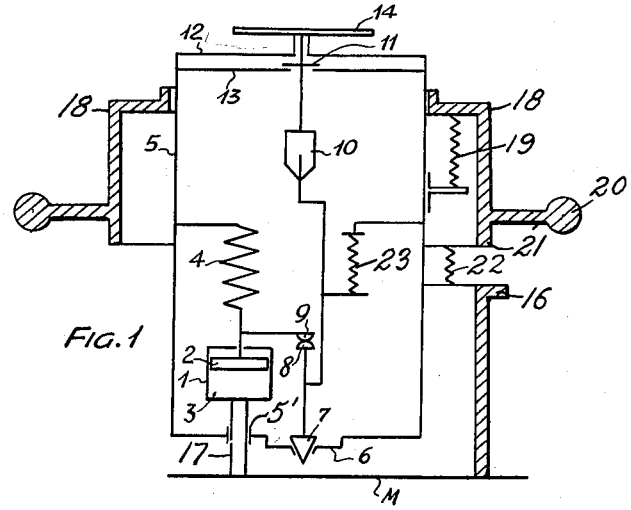
FIGURE 1 is a very diagrammatic arrangement for the purpose of showing the inventive principle on which the apparatus according to the invention is based.

As it is apparent from FIGURE 1, a damper 1, for instance of the oil driven type, is placed in fixed position on the surface of the test-material, the said damper 1 being filled with an oil mass 3 keeping the piston 2 in elevated position. The said piston 2 is connected to the lower end of a coil spring 4, the upper end of which is fixed to the casing 5 provided with a bottom 6, suitably apertured to provide a passage there-through for the penetrating tip 7 made of diamond or other hard product. The said tip 7 is free to slide through the said bottom 6 and is provided at its upper end with a contact surface 8 engaging a further contact surface 9 attached to the lower end of the coil spring 4, and carrying the load applied by the coil spring 4. The penetrating tip 7 is furthermore connected through a slider 10 and a flat element 11 to a measuring instrument, the said flat element 11 being free to move between an upper wall 12 and a lower wall 13 fixed to the casing 5. The distance between the two walls 12 and 13 is smaller than the possible projection of the penetrating tip 7 from the bottom 6.

It should be noted that the casing 5 is mounted in an axially slidable relation with respect to the damper 1. The instrument 14 may be of the hydraulic drive type specified in detail in my Patent No. 2,742,781 or it may be of any other type as long as for every axial displacement of the penetrating tip it produces a magnified easily readable displacement of its pointer.

The operation of the specified diagram according to FIG. 1 is as follows:

In inoperative conditions the measuring apparatus is as shown in FIG. 1, that is, the contact surface 9 applies the load of the calibrated spring 4 to the contact surface 8 thereby causing the outermost displacement of the tip 7, said displacement being limited by a stop shoulder. In correspondence with this outermost position of the tip 7, the flat element 11 rests on the wall 13 and the pointer of the instrument 14 points at an end position in the dial.

Should it now be desired to perform a hardness measurement on some material, the casing 5 is pushed downwards until its bottom surface 6 comes to rest on the metal surface M, and the tip 7 is at the same level as bottom surface 6. As the oil mass of the damper 1 compresses the spring 4 and keeps the surface 9 elevated and detached from the surface 8, the tip 7, as shown in FIGURE 1, is merely subjected to the load of the measuring instrument and to the friction of the slider 10 allowing a stroke of the penetrating tip 7 larger than the stroke of the flat element 11 between the walls 12 and 13. The upward displacement of the tip 7 urges the flat element 11 against the wall 12 thus causing the zero setting of the instrument 14.

The spring 4 being now in a supercompressed condition urges the piston downwards into the damper 1 while the oil rises passing through the calibrated openings, this working system being the conventional one used in connection with dampers and therefore not further specified. The spring 4 will return to the position shown in FIG. 1, whereby the surface 9 will again contact surface 8 transferring the load thereof to the penetrating tip 7 indenting more or less the material surface to be tested according to the hardness of said surface. After having been strongly magnified, the projection of the tip 7 into said material surface is readable on the measuring instrument, the dial of which has been directly subdivided and calibrated in degrees of hardness.

A further spring 23 is provided to determine the preload on the penetration tip 7.

Figure 2:
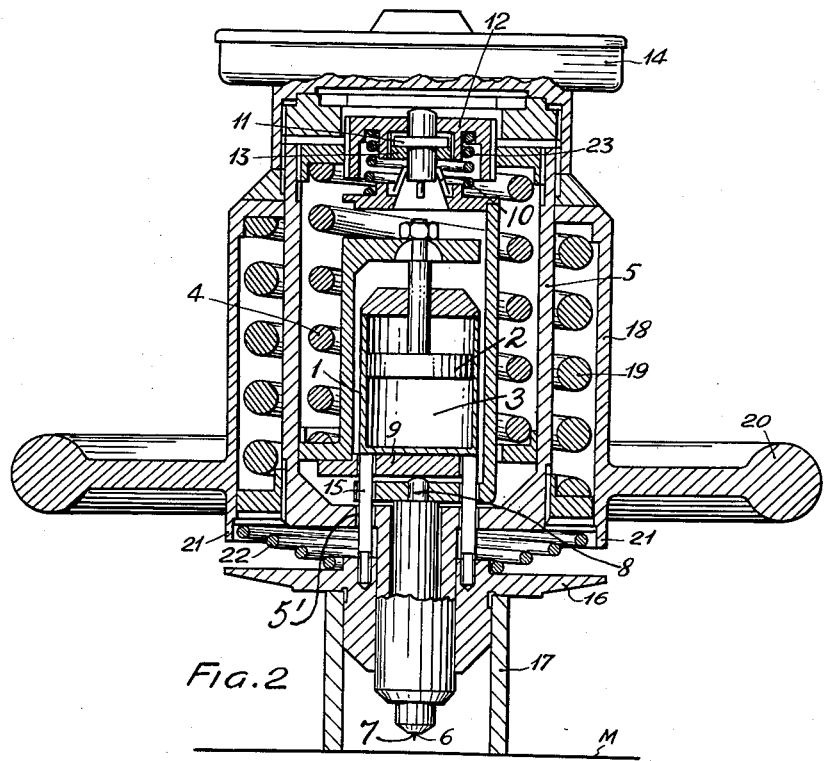
FIGURE 2 is a partially sectioned elevation of a particular embodiment according to the present invention.

An embodiment of the invention with several constructive details allowing the practical carrying out of the diagrammatic device of FIG. 1 is illustrated in FIG. 2.

In the said embodiment the damper 1 is fixed by means of the supporting legs 15 to a flanged sleeve 16 mounted on a supporting base 17 resting on the metal surface M to be tested. The sleeve 16 is provided with a central bore allowing the sliding fit therein of the lower and smaller part of the casing 5 with its bottom surface 6.

The several elements constituting the casing 5 are detachably assembled to form the said casing 5, thus allowing the easy replacement of the worn-out parts as well as a simple mounting of the inner parts.

The casing 5 is surrounded by an outer member 18 fixed to the said casing by means of a spring 19 and provided with lateral means 20 for facilitating the application of the downward thrust to the casing 5.

The said thrust is prevented from assuming a value larger than the allowed value by means of the supporting projection 21 provided on the lower part of the outer member 18 positioned to move into contact with the sleeve 16. A spring 22 is disposed between the member 18 and the said sleeve 16, the said spring 22 being adapted to urge the device 13 upwards when the downward thrust is released, i.e., after having carried out the measurement.

The other elements of the apparatus will not be further described as, thanks to the fact that they bear the same reference numerals as those of FIG. 1, their function and their relative connection to other elements of the apparatus are readily apparent.

It should be noted that in the embodiment of FIG. 2, the penetrating tip 7, the damper 1 as well as all the other parts are perfectly coaxial, that all the elements constituting the apparatus have been so devised as not to interfere with one another and especially as to allow a perfectly balanced application of the various stresses with no danger whatsoever of causing the deflection of some elements of the apparatus.

The apparatus according to the present invention may be mounted on a support and urged against the test-material by means of any suitable device, thus realizing a unit with self-zero setting and self-application of the load, which is particularly suitable for high rate hardness measurements.

What I claim is:

1. In a hardness measuring apparatus, the combination comprising a casing with a measuring means and a lower surface containing an opening therein, a penetrating means slidably positioned within said casing, said penetrating means having a tip portion adapted to extend through the lower surface of the casing and also having an upper portion connected to said measuring means, calibrated spring means in said casing adapted to apply pressure to the penetrating means, delaying means connecting the calibrated spring means to the penetrating means, preliminary surface-contacting means slidably mounted with respect to said casing and adapted to be slidably extended from said lower surface of the casing to a point beyond the greatest extension of said penetrating tip, means connecting one part of said delaying means to said calibrated spring, whereby the lower surface of said casing may be pressed against a surface to be tested until the penetrating tip means is substantially completely retracted within said casing before said calibrated spring starts to act on said penetrating means, slider-friction means connecting the upper portion of said penetrating means to the measuring means, cooperating means on said slider friction means to limit the movement of the slider.

2. In a hardness measuring apparatus, the combination comprising a casing with a measuring means and a lower surface containing an opening therein, a penetrating means slidably positioned within said casing, said penetrating means having a tip portion adapted to extend through the lower surface of the casing and also having an upper portion connected to said measuring means, calibrated spring means in said casing adapted to apply pressure to the penetrating means, a supporting base slidably mounted with respect to the lower portion of said casing and having a preliminary surface contacting portion adapted to rest against the surface to be tested, delaying means within said casing having a first part which is fixed with respect to said supporting base and a second part which is movable between the calibrated spring means and the penetrating means, means connecting said second part of the delaying means to said calibrated spring means whereby the lower surface of said casing may be pressed against a surface to be tested until the penetrating tip means is substantially completely retracted within lower portion of the said casing before said calibrated spring starts to act on said penetrating means, slider-friction means connecting the upper portion of said penetrating means to the measuring means, cooperating means on said slider friction means to limit the movement of the slider.

3. The apparatus as claimed in claim 2 wherein said preliminary surface contacting means is in the form of a sleeve and surrounds the penetrating tip of the penetrating means.

4. The apparatus as claimed in claim 1 comprising an outer member surrounding the casing, spring means connecting the outer member to the casing, handle means on the outer member to facilitate manually applying a downward thrust to the device.

5. In a hardness measuring apparatus as in claim 2, wherein said delaying means comprises a damper having a fluid-holding chamber and a piston, the first part of said delaying means consisting of said fluid-holding chamber and the second part of said delaying means comprising said piston, said piston having calibrated openings therein to permit delaying movement of the piston through the fluid in said chamber.

References Cited in the file of this patent

UNITED STATES PATENTS

| 2,246,146 | Smith | June 17, 1941 |
| 2,667,065 | Ernst | Jan. 26, 1954 |
| 2,892,344 | Sklar | June 30, 1959 |

FOREIGN PATENTS

| 613,930 | Germany | May 29, 1935 |